United States Patent
Hand

(10) Patent No.: US 10,487,983 B2
(45) Date of Patent: Nov. 26, 2019

(54) COMPOSITE JOINT

(71) Applicant: The Boeing Company, Chicago, IL (US)

(72) Inventor: Michael Leslie Hand, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 394 days.

(21) Appl. No.: 15/228,417

(22) Filed: Aug. 4, 2016

(65) Prior Publication Data

US 2018/0038547 A1 Feb. 8, 2018

(51) Int. Cl.
| | |
|---|---|
| *F17C 13/06* | (2006.01) |
| *F17C 1/08* | (2006.01) |
| *B64D 1/00* | (2006.01) |
| *F17C 1/16* | (2006.01) |
| *B64D 37/30* | (2006.01) |
| *B64G 1/40* | (2006.01) |

(52) U.S. Cl.
CPC ............... *F17C 1/08* (2013.01); *B64D 1/00* (2013.01); *F17C 1/16* (2013.01); *F17C 13/06* (2013.01); *B64D 37/30* (2013.01); *B64G 1/402* (2013.01); *F17C 2201/0109* (2013.01); *F17C 2201/056* (2013.01); *F17C 2203/012* (2013.01); *F17C 2205/0311* (2013.01); *F17C 2209/227* (2013.01); *F17C 2209/228* (2013.01); *F17C 2209/234* (2013.01); *F17C 2221/033* (2013.01); *F17C 2223/0161* (2013.01); *F17C 2260/012* (2013.01); *F17C 2270/01* (2013.01); *F17C 2270/0168* (2013.01); *F17C 2270/0189* (2013.01)

(58) Field of Classification Search
CPC ............... F17C 13/06; F17C 2209/227; F17C 2209/228; F16J 13/00
See application file for complete search history.

(56) References Cited

U.S. PATENT DOCUMENTS

| | | | | |
|---|---|---|---|---|
| 4,640,031 | A | * | 2/1987 | Hoek .................... F17C 13/003 40/306 |
| 5,494,188 | A | * | 2/1996 | Sirosh ....................... F17C 1/16 220/590 |

(Continued)

FOREIGN PATENT DOCUMENTS

| | | |
|---|---|---|
| DE | 19631546 C1 | 11/1997 |
| FR | 2962782 B1 | 1/2014 |

(Continued)

OTHER PUBLICATIONS

Federal Institute of Industrial Property (FIPS,) Office Action, Search Report, and English Translation, dated Apr. 26, 2018, regarding Application No. 2017116843/05, 15 pages.

(Continued)

*Primary Examiner* — Daniel J Wiley
(74) *Attorney, Agent, or Firm* — Yee & Associates, P.C.

(57) ABSTRACT

A method, a composite joint, and a composite tank are presented. The composite tank comprises a curved wall, a plurality of shear fittings, and a plurality of bolts. The curved wall has an opening. The plurality of shear fittings is threaded into a plurality of blind holes in the curved wall around the opening. The plurality of bolts engages the plurality of shear fittings and joins a cap to the curved wall.

20 Claims, 8 Drawing Sheets

(56) References Cited

U.S. PATENT DOCUMENTS

| | | | | |
|---|---|---|---|---|
| 8,881,932 B1* | 11/2014 | Warner | ............... | F17C 1/005 |
| | | | | 220/581 |
| 9,568,150 B2* | 2/2017 | Warner | ............... | F17C 1/005 |
| 2008/0047963 A1* | 2/2008 | Wilson | ............... | F17C 13/06 |
| | | | | 220/582 |

FOREIGN PATENT DOCUMENTS

| | | | |
|---|---|---|---|
| WO | 9423241 A1 | 10/1994 | |
| WO | WO2017030732 A1 | 2/2017 | |

OTHER PUBLICATIONS

Extended European Search Report, dated Nov. 9, 2017, regarding Application No. 17169498.7, 9 pages.
Federal Engineering & Design Support, F.E.D.S., "Screw Thread Design," The Fastenal Company, Copyright 2016, 7 pages. https://www.fastenal.com/content/feds/pdf/Article%20-%20Screw%20Threads%20Design.pdf.

* cited by examiner

COMPOSITE JOINT

BACKGROUND INFORMATION

1. Field

The present disclosure relates generally to joining components and, in particular, to joining composite components. Still more particularly, the present disclosure relates to securing a cap over an opening in a composite wall to form a joint.

2. Background

In vehicles, increased weight decreases fuel efficiency of the vehicles. In spacecraft and aircraft, additional weight of the vehicle replaces potential payload such as customers, equipment, or other goods.

Storage containers associated with vehicles may include tanks, such as cryotanks. Cryogenic fluids, such as fuels, are stored in the cryotanks on-board the vehicles. Decreasing at least one of size or weight of the cryotanks used on the vehicles may be desirable to increase the payload for the vehicles.

Joints in storage containers have a number of leak paths. Leak paths create the potential for leaking of a stored gas or liquid from the storage containers. As a result, reducing the number of leak paths in a storage container, such as a cryotank, may be desirable. Therefore, it would be desirable to have a method and apparatus that take into account at least some of the issues discussed above, as well as other possible issues.

SUMMARY

In one illustrative embodiment, a composite tank is presented. The composite tank comprises a curved wall, a plurality of shear fittings, and a plurality of bolts. The curved wall has an opening. The plurality of shear fittings is threaded into a plurality of blind holes in the curved wall around the opening. The plurality of bolts engages the plurality of shear fittings and joins a cap to the curved wall.

In another illustrative embodiment, a composite joint is presented. The composite joint comprises a composite wall, a polar cap, a plurality of shear fittings, and a plurality of bolts. The composite wall has a polar opening. The plurality of shear fittings is threaded into an edge of the polar opening. The plurality of bolts extends through the polar cap and engages the plurality of shear fittings.

In yet another illustrative embodiment, a method is presented. A plurality of shear fittings is threaded into a plurality of blind holes around an opening in a composite wall. A cap is positioned over the opening in the composite wall. The cap is secured over the opening in the composite wall to form a joint.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
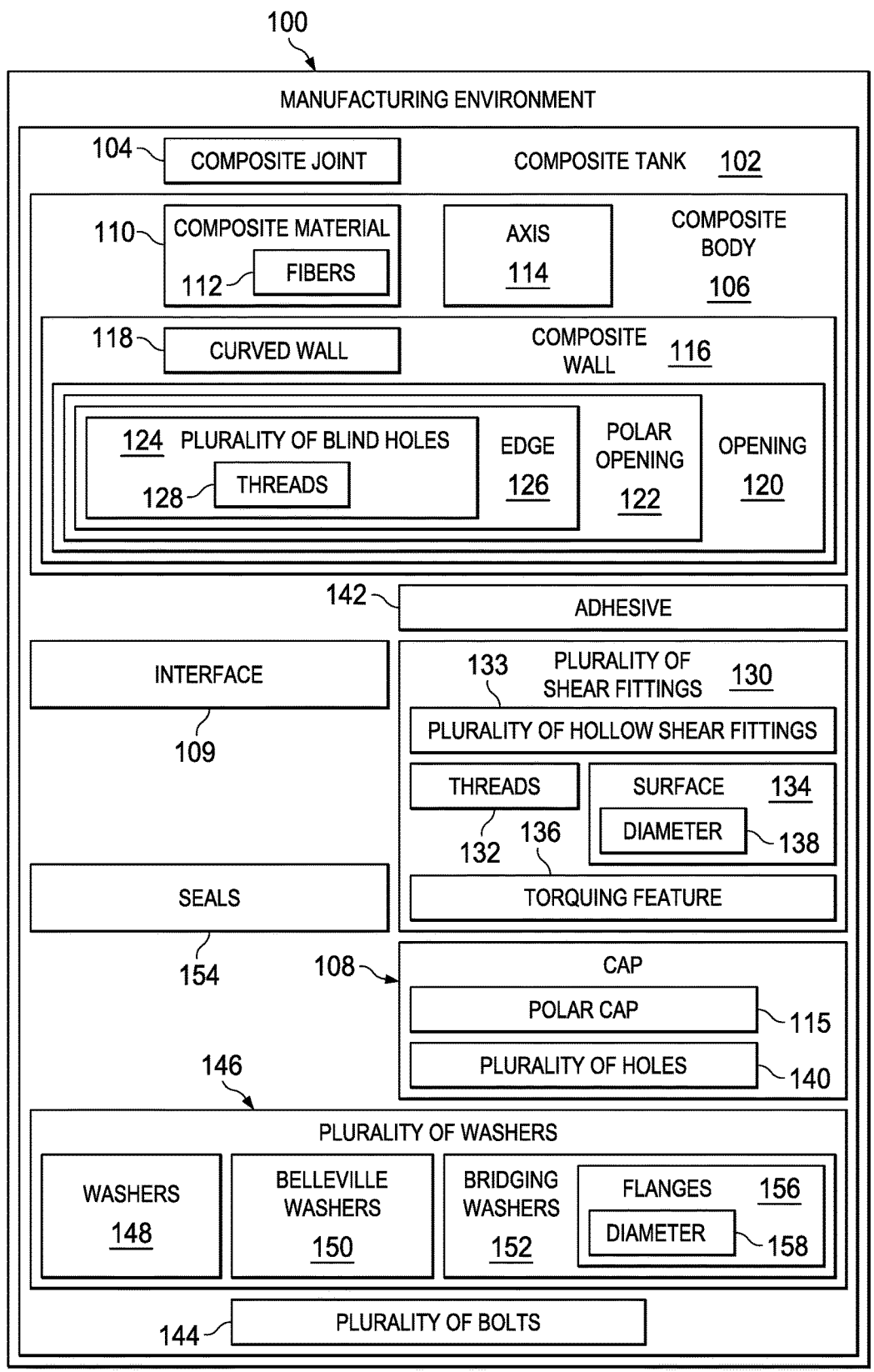
FIG. 1 is an illustration of a block diagram of a manufacturing environment in accordance with an illustrative embodiment.

The different illustrative embodiments recognize and take into account one or more different considerations. For example, the illustrative embodiments recognize and take into account that composite materials are used in aircraft to decrease the weight of the aircraft. This decreased weight improves performance features such as payload capacities and fuel efficiencies. Further, the composite materials provide longer service life for various components in an aircraft.

The different illustrative embodiments recognize and take into account that composite materials are tough, light-weight materials created by combining two or more functional components. For example, a composite material may include reinforcing fibers bound in polymer resin matrix. The fibers may be unidirectional or may take the form of a woven cloth or fabric. The fibers and resins are arranged and cured to form a composite material.

Thus, the different illustrative embodiments recognize and take into account that it may be desirable to form a composite cryotank. Yet further, the different illustrative embodiments recognize and take into account that it may be desirable to reduce at least one of the weight or the number of leak paths of a composite cryotank. Although the different illustrative embodiments are discussed with reference to cryotanks, a composite joint may be applicable to any desirable type of composite tank.

The different illustrative embodiments further recognize and take into account that a conventional tank may include shear pins extending through holes in the body of the tank. The different illustrative embodiments recognize and take into account that each of these shear pins extending through a respective hole in the body of the tank creates a leak path.

The different illustrative embodiments also recognize and take into account that composite materials may fail through a process called delamination. Delamination is the separation of layers of the composite material. Delamination may be caused by an applied load on the composite material.

The different illustrative embodiments further recognize and take into account that a composites engineer would be aware of the relatively low through-the-thickness strengths of composite laminates. Further, a typical composites engineer would not have experience with threaded fasteners in a composite material. Threaded fasteners in composite materials are not typical, nor an industry standard. Accordingly, a composite engineer may expect a threaded fastener to produce delamination in a composite material with low loads. The different illustrative embodiments thus recognize and take into account that it would be conventionally expected for a threaded fastener in a composite material to be unable to carry an appreciable load reliably.

The different illustrative embodiments also recognize and take into account that fasteners have industry wide specifications. Coarseness is a specification designation for fasteners. Within a thread series, fine, standard, or coarse threads or other configuration options may be offered as potentially useful variations. A coarse fastener may be designated with a "C" in the series title. A fine fastener may be designated with an "F" in the series title. A coarse thread will have fewer threads per inch than a standard thread. For a given thread diameter, the thickness of a thread at its root will be greater for a coarse thread than a standard thread. The different illustrative embodiments recognize and take into account that increased thread depth may make a stronger joint in soft materials, such as magnesium or composites.

With reference now to the figures and, in particular, with reference to FIG. 1, an illustration of a block diagram of a manufacturing environment is depicted in accordance with an illustrative embodiment. Manufacturing environment 100 is an environment in which manufacturing processes are performed to create composite tank 102. More specifically, composite joint 104 of composite tank 102 is formed in manufacturing environment 100.

In composite joint 104, shear forces are greater than tension forces. Composite joint 104 may be referred to as a shear-dominated joint.

Although composite joint 104 is depicted as a part of composite tank 102, in some illustrative examples, composite joint 104 may be part of a different structure. Composite joint 104 may be placed in any desirable structure as a shear-dominated composite joint. For example, composite joint 104 may be part of any desirable type of platform, such as a stationary platform or a mobile platform. The platform may take the form of a dome, a roof, a vehicle, a building, or any other desirable type of platform.

As depicted, composite tank 102 includes composite joint 104 joining composite body 106 and cap 108. Interface 109 between composite body 106 and cap 108 is substantially planar. Composite body 106 is made of composite material 110 including fibers 112. As depicted, composite body 106 has axis 114. Axis 114 is an axis of rotation for composite body 106. The two locations of composite body 106 that contact axis 114 may be referred to as the "poles" of composite body 106. Components associated with the "poles" of composite body 106 may be referred to as "polar." For example, when cap 108 is associated with a "pole" of composite body 106, cap 108 may be referred to as polar cap 115.

Composite body 106 is formed by composite wall 116. In some illustrative examples, composite wall 116 is curved and may be referred to as curved wall 118. Curved wall 118 may have any desirable curvature. For example, curved wall 118 may have a constant curvature or a varying curvature.

Composite wall 116 has opening 120. When opening 120 is positioned at one of the "poles" of composite body 106, as indicated by axis 114, opening 120 is referred to as polar opening 122. Opening 120 may have any desirable size or shape. In some illustrative examples, opening 120 is substantially round.

Plurality of blind holes 124 is positioned in edge 126 of opening 120. Plurality of blind holes 124 is in composite wall 116 around opening 120. Plurality of blind holes 124 has any desirable size and shape. In some illustrative examples, plurality of blind holes 124 has flat bottoms. In some illustrative examples, plurality of blind holes 124 has threads 128. When plurality of blind holes 124 has threads 128, plurality of blind holes 124 may be referred to as "threaded."

The central axes of plurality of blind holes 124 are substantially parallel to each other. If the central axes of plurality of blind holes 124 are not substantially parallel, cap 108 will not properly sit against composite body 106. Further, the central axes of plurality of blind holes 124 are substantially perpendicular to interface 109 plane between cap 108 and composite wall 116.

To connect cap 108 to composite wall 116, plurality of shear fittings 130 are threaded into plurality of blind holes 124. Plurality of shear fittings 130 have threads 132. Threads 132 may be described as oversized, coarse threads. The coarseness of a thread on a component is chosen based on the softness of the material receiving the threaded component. The coarseness of threads 132 is chosen based on composite material 110.

Plurality of shear fittings 130 may be solid. To save on weight, plurality of shear fittings 130 may have hollow interiors. In these illustrative examples, plurality of shear fittings 130 may be referred to as plurality of hollow shear fittings 133.

Each of plurality of shear fittings 130 includes surface 134 and torqueing feature 136. Surface 134 has diameter 138. The load that composite joint 104 may carry is affected by the size of surface 134 of plurality of shear fittings 130. By adjusting the size of surface 134, the joint strength is varied. The size of surface 134 is changed by changing at least one of the height of surface 134 or diameter 138. Joint strength is obtained by adjusting diameter 138, however diameter 138 would cause cap 108 to be thicker, also increasing the weight. Bearing load decreases away from the shear plane. As a result, a smaller diameter 138 but larger height is less weight efficient than a larger diameter 138 but shorter height.

Diameter 138 is affected by the bearing load capability of the material of composite body 106 and cap 108. Joint strength is affected by the bearing load capability of the material of composite body 106 and cap 108. When the bearing load capability is lower, the dimensions of surface 134 may be increased to increase the joint strength.

Surface 134 is configured to contact an interior surface of a respective hole of plurality of holes 140 in cap 108. Surface 134 is a shear transfer surface for composite joint 104. In some illustrative examples, surface 134 is cylindrical.

Torqueing feature 136 allows each shear fitting of plurality of shear fittings 130 to be threaded into plurality of blind holes 124 in composite wall 116. Torqueing feature 136 takes any desirable form. In some illustrative examples, torqueing feature 136 is a hexagonal feature axially outboard of surface 134. Other illustrative examples of torqueing feature 136 include other wrenching flat geometries, such as two flats on a cylindrical boss, an oversized screwdriver slot, pin holes that could be engaged by a pin wrench, or any other desirable type of feature.

Adhesive 142 may be applied to at least one of plurality of blind holes 124 or plurality of shear fittings 130. As used herein, the phrase "at least one of," when used with a list of items, means different combinations of one or more of the listed items may be used, and only one of each item in the list may be needed. In other words, "at least one of" means any combination of items and number of items may be used from the list but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

Adhesive 142 may prevent plurality of shear fittings 130 from being removed from plurality of blind holes 124 by vibration. Adhesive 142 may be applied using any desirable method. In some illustrative examples, adhesive 142 may be painted onto at least one of threads 128 or threads 132. When adhesive 142 is applied to both threads 128 and threads 132, the bond between plurality of shear fittings 130 and composite wall 116 is increased. Adhesive 142 takes the form of any desirable type of adhesive. In some illustrative examples, adhesive 142 may be an epoxy.

To connect cap 108 to composite wall 116, plurality of bolts 144 are attached to plurality of shear fittings 130. Plurality of bolts 144 extend through plurality of holes 140 and are threaded into plurality of shear fittings 130.

Plurality of bolts 144 also extend through plurality of washers 146. Plurality of washers 146 is positioned between the heads of plurality of bolts 144 and cap 108. As depicted, plurality of washers 146 includes at least one of washers 148, Belleville washers 150, or bridging washers 152. Belleville washers 150 may be used to maintain tension between cap 108 and composite wall 116. More specifically, Belleville washers 150 may maintain tension during temperature changes.

Seals 154 are positioned between cap 108 and composite wall 116 to prevent or reduce leaking through composite joint 104. Seals 154 have to be under pressure to function. Thus, seals 154 are clamped to prevent leaks from composite joint 104. Bridging washers 152 provide clamping for seals 154. Bridging washers 152 contact the surface of cap 108 opposite interface 109. Further, bridging washers 152 include flanges 156 having diameter 158.

Diameter 158 and diameter 138 are substantially the same. A respective flange of flanges 156 and surface 134 both contact an interior surface of a respective hole of plurality of holes 140 extending through cap 108.

The size of bridging washers 152 is affected by the size of opening 120. As the size of opening 120 increases, the size of bridging washers 152 also increases. Increasing the size of bridging washers 152 also increases the weight of bridging washers 152. To decrease the weight of bridging washers 152, bridging washers 152 may be formed of ceramic matrix composite (CMC) or monolithic ceramic rather than a metal. Further, the coefficient of thermal expansion of the material forming bridging washers 152 is preferably close to the coefficient of thermal expansion of composite material 110. The difference in the coefficient of thermal expansion (CTE) between composite material 110 and a ceramic matrix composite (CMC) or monolithic ceramic is less than the difference in the coefficient of thermal expansion (CTE) between composite material 110 and aluminum. Having a reduced difference in the coefficient of thermal expansion between composite wall 116 and bridging washers 152 is desirable to keep the geometry of composite joint 104 stable as composite joint 104 is subjected to changes in temperature.

The tension load across composite joint 104 is very small compared to the shear load. The tension joint is formed using plurality of bolts 144.

Monolithic ceramics are conventionally considered to have limited uses due to a relatively low tension capability. The tension capability of monolithic ceramics is a fraction of their compressive capability. However, the use of bridging washers 152 is for a primarily compressive application.

As depicted, composite tank 102 includes curved wall 118 having opening 120; plurality of shear fittings 130 threaded into plurality of blind holes 124 in curved wall 118 around opening 120; and plurality of bolts 144 engaging plurality of shear fittings 130 and joining cap 108 to curved wall 118 to form composite joint 104 between cap 108 and curved wall 118. Plurality of bolts 144 extends through plurality of holes 140 in cap 108. An interior surface of each of plurality of holes 140 engages a face of a respective shear fitting of plurality of shear fittings 130. This face is surface 134.

Composite tank 102 further comprises plurality of washers 146, wherein plurality of bolts 144 extends through plurality of washers 146, and wherein an interior surface of each of plurality of holes 140 engages a face of a respective washer of plurality of washers 146. This face is at least a portion of a respective flange of flanges 156.

In some illustrative examples, each of plurality of washers 146 is a ceramic matrix composite material or a monolithic ceramic. In these illustrative examples, plurality of washers 146 takes the form of bridging washers 152. This does not preclude the use of additional washers such as washers 148 or Belleville washers 150.

The illustrations of composite joint 104 and composite tank 102 in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, any desirable type or quantity of washers may be present in composite tank 102. Further, a second polar joint may also be present in composite tank 102.

Figure 2:
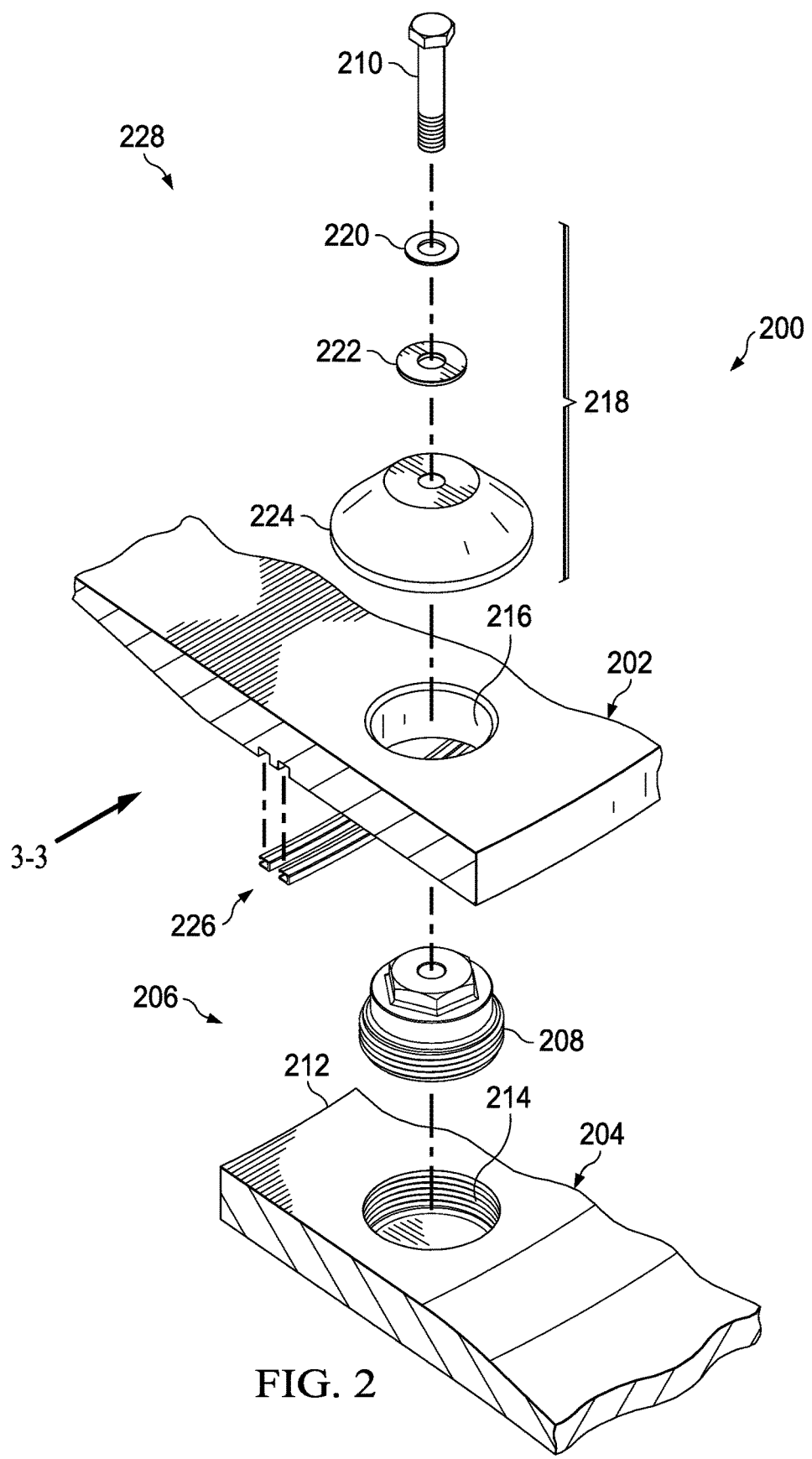
FIG. 2 is an illustration of an exploded view of a portion of a composite joint in accordance with an illustrative embodiment.

Turning now to FIG. 2, an illustration of an exploded view of a portion of a composite joint is depicted in accordance with an illustrative embodiment. Composite joint 200 is a physical implementation of composite joint 104 of FIG. 1.

Composite joint 200 joins cap 202 to composite wall 204 having opening 206. Composite joint 200 includes composite wall 204 having opening 206, cap 202, shear fitting 208, and bolt 210. Shear fitting 208 is one physical implementation of a shear fitting of plurality of shear fittings 130 in FIG. 1.

To join cap 202 to composite wall 204, shear fitting 208 is threaded into edge 212 of opening 206. More specifically, shear fitting 208 is threaded into blind hole 214 in composite wall 204. As depicted, shear fitting 208 has threads to engage composite wall 204. The threads of shear fitting 208 may be described as oversized, coarse threads. The coarseness of a thread on a component is chosen based on the softness of the material receiving the threaded component. Further, as depicted, blind hole 214 is threaded.

Bolt 210 extends through hole 216 in cap 202. Hole 216 is precision machined such that walls of hole 216 engage shear fitting 208 when cap 202 is secured over opening 206 in composite wall 204. Bolt 210 engages shear fitting 208 and joins cap 202 to composite wall 204 to form composite joint 200 between cap 202 and composite wall 204.

Plurality of washers 218 is positioned between the head of bolt 210 and cap 202. As depicted, plurality of washers 218 includes washer 220, Belleville washer 222, and bridging washers 224. Belleville washer 222 is present for maintaining tension in the assembly. More specifically, Belleville washer 222 maintains tension during temperature changes.

Bridging washer 224 is considerably larger than conventional bridging washers. Bridging washer 224 may be referred to as "oversized." By increasing the size of bridging washer 224, the weight of bridging washer 224 would also be increased in conventional materials such as metals. Bridging washer 224 may be formed of any desirable material. The material for bridging washer 224 may be selected based on at least one of density, compressive strength, coefficient of thermal expansion, or any other desirable characteristic. In some illustrative examples, bridging washer 224 is formed of ceramic matrix composite (CMC) or monolithic ceramic. When assembled, bridging washer 224 maintains the clamp-up at edges of seals 226.

Seals 226 reduce or prevent leakage from the composite tank. To prevent leakage, seals 226 are held against composite wall 204 through clamping pressure provided by plurality of washers 218 and bolt 210 engaging shear fitting 208.

View 228 of composite joint 200 is of a single joining assembly. In some illustrative examples, composite joint 200 includes a plurality of joining assemblies. In these illustrative examples, shear fitting 208 is one of a plurality of shear fittings threaded into edge 212 of opening 206. The plurality of shear fittings is threaded into a plurality of blind holes in composite wall 204 around opening 206. Bolt 210 is one of a plurality of bolts extending through cap 202 and engaging the plurality of shear fittings. The plurality of bolts engaging the plurality of shear fittings join cap 202 to composite wall 204 to form composite joint 200 between cap 202 and composite wall 204.

Figure 3:
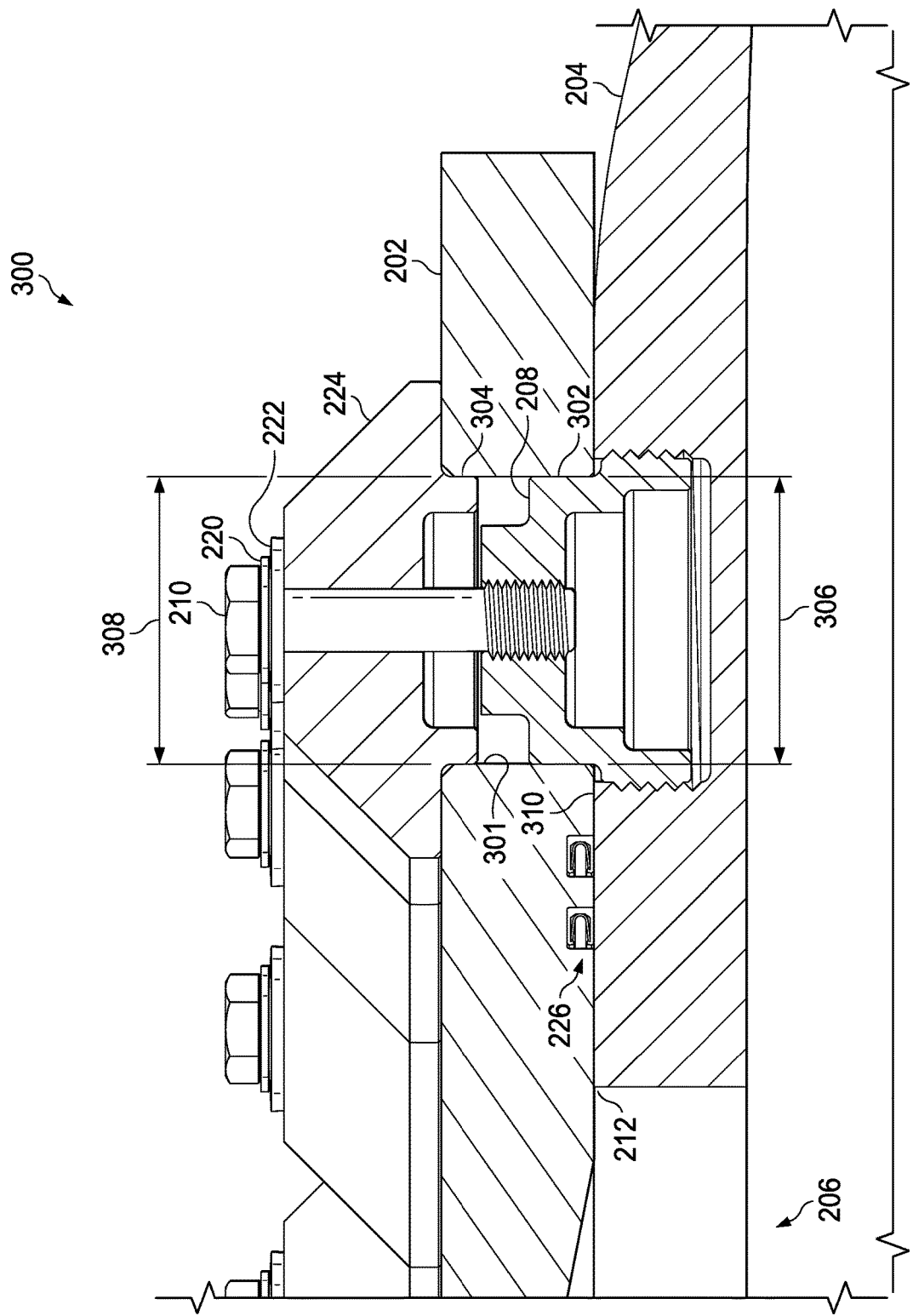
FIG. 3 is an illustration of a cross-sectional front view of a portion of a composite joint in accordance with an illustrative embodiment.

Turning now to FIG. 3, an illustration of a cross-sectional front view of a portion of a composite joint is depicted in accordance with an illustrative embodiment. View 300 is a cross-sectional front view of composite joint 200 of FIG. 2. More specifically, view 300 is a view of composite joint 200 of FIG. 2 from direction 3-3.

As depicted, interior surface 301 of hole 216 extending through cap 202 engages surface 302 of shear fitting 208. Further, interior surface 301 of hole 216 engages flange 304 of bridging washer 224. As a result, diameter 306 of shear fitting 208 and diameter 308 of bridging washer 224 are substantially the same. Shear is carried through this connection of shear fitting 208 and cap 202.

Bridging washer 224 compresses seals 226 between cap 202 and composite wall 204 to prevent leaks at interface 310. As depicted, interface 310 is substantially planar. For cap 202 to engage and form composite joint 200 with composite wall 204, interface 310 is substantially planar and perpendicular to the central axis of shear fitting 208.

Figure 4:
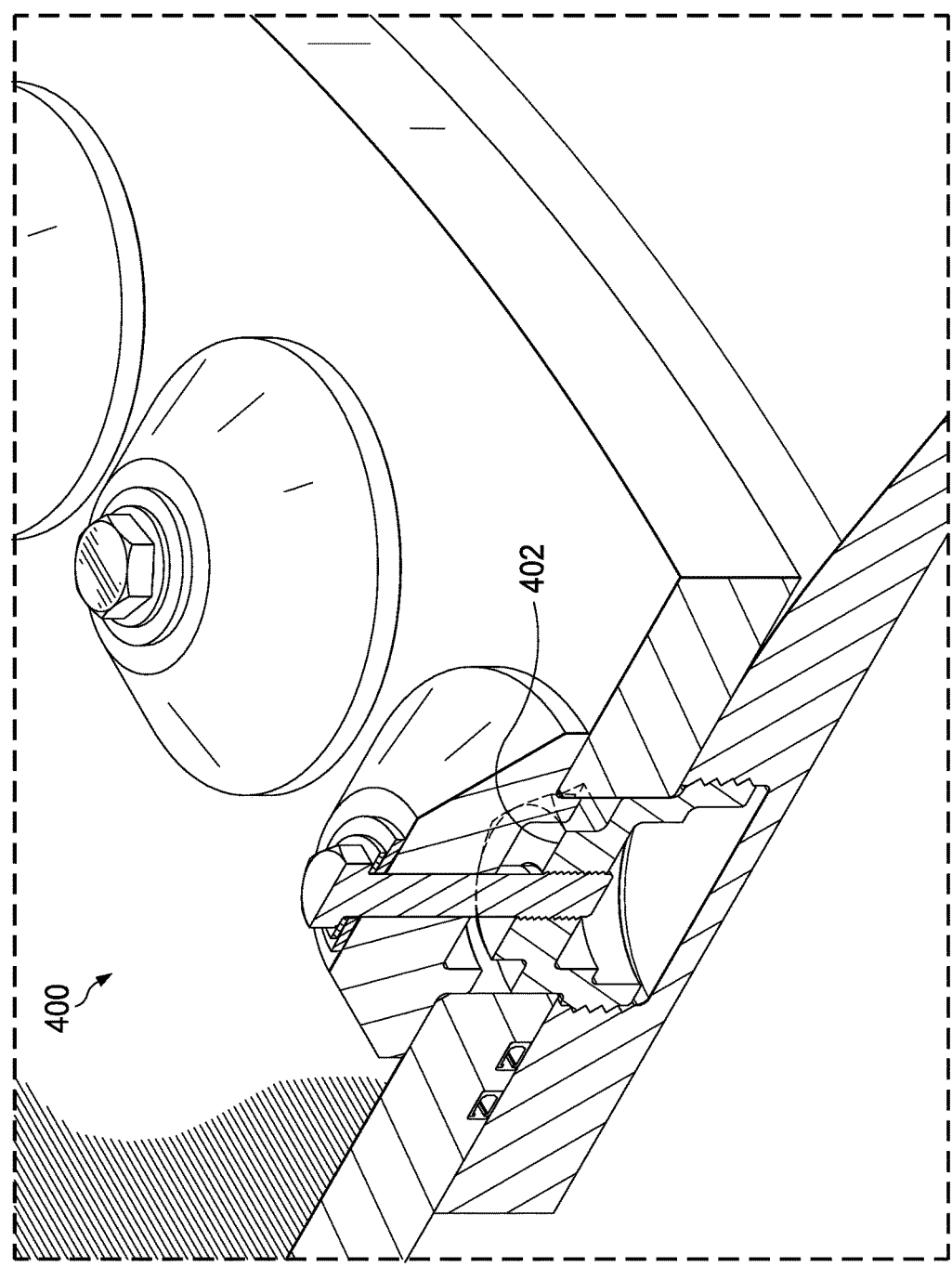
FIG. 4 is an illustration of a cross-sectional isometric view of a portion of a composite joint in accordance with an illustrative embodiment.

Turning now to FIG. 4, an illustration of a cross-sectional isometric view of a portion of a composite joint is depicted in accordance with an illustrative embodiment. View 400 is a cross-sectional isometric view of composite joint 200 of FIG. 2. View 400 is an assembled view of composite joint 200 from the direction shown in FIG. 2. As can be seen from view 400, torqueing feature 402 is a hexagonal feature in this illustrative example.

Figure 5:
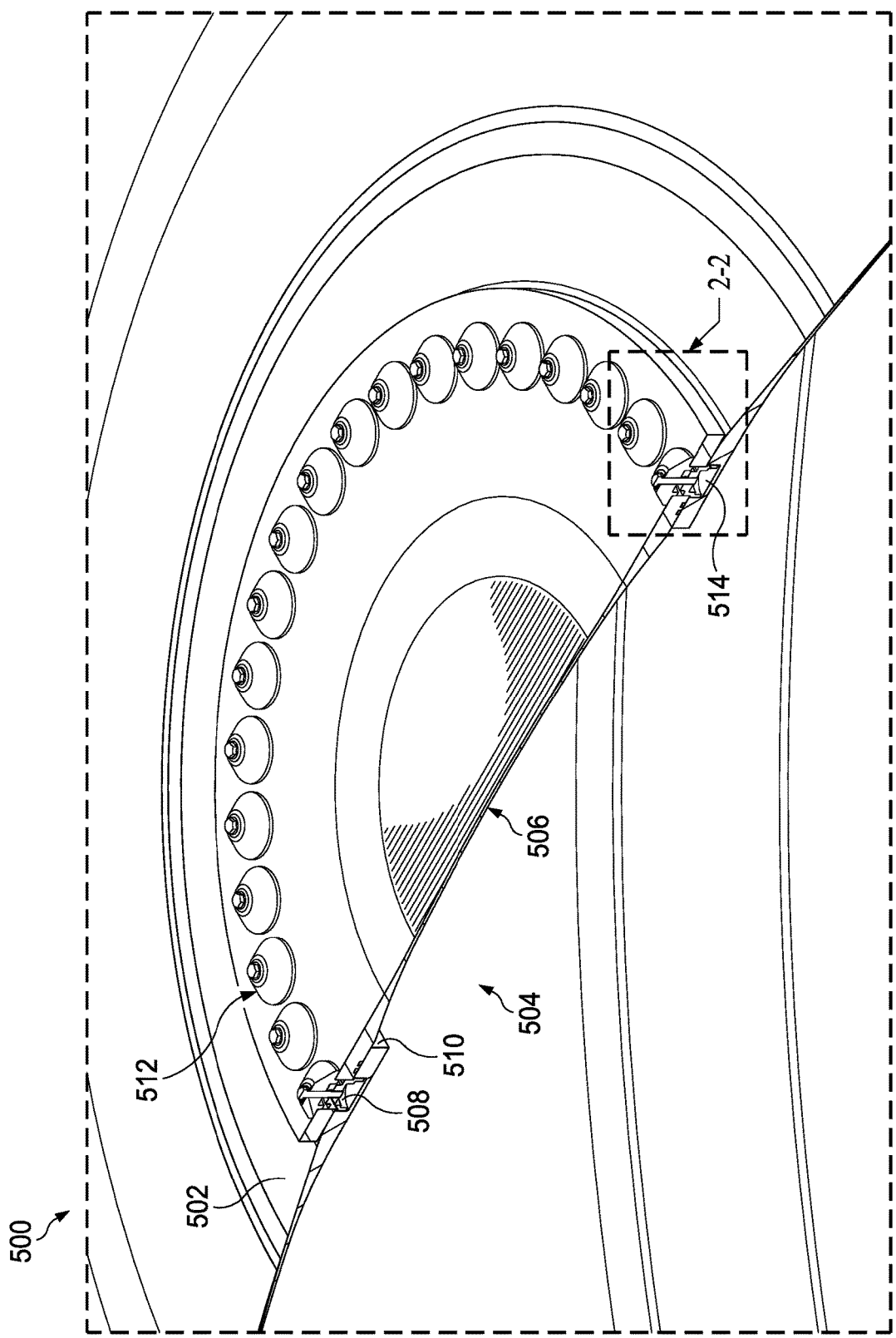
FIG. 5 is an illustration of a cross-sectional isometric view of a composite joint in accordance with an illustrative embodiment.

Turning now to FIG. 5, an illustration of a cross-sectional isometric view of a composite joint is depicted in accordance with an illustrative embodiment. In some illustrative examples, composite joint 200, as depicted in FIG. 2, is a portion of composite joint 500 of FIG. 5. For example, composite joint 200 of FIG. 2 may be a view within box 2-2 in FIG. 5.

Composite joint 500 comprises composite wall 502 having polar opening 504, polar cap 506, plurality of shear fittings 508 threaded into edge 510 of polar opening 504, and plurality of bolts 512 extending through polar cap 506 and engaging plurality of shear fittings 508. In this illustrative example, plurality of shear fittings 508 is threaded into plurality of blind holes 514 in composite wall 502. An adhesive is present between threads of plurality of shear fittings 508 and composite wall 502. The adhesive is applied to at least one of the threads of plurality of shear fittings 508 or walls of plurality of blind holes 514.

Composite joint 500 further comprises a plurality of washers engaging plurality of bolts 512 and polar cap 506. In one illustrative example, the plurality of washers takes the form of a plurality of bridging washers. In this example, each of the plurality of washers comprises a flange contacting a respective hole of polar cap 506. Further, each of plurality of shear fittings 508 comprises a surface contacting the respective hole of polar cap 506 such that a diameter of the surface and a diameter of the flange are substantially the same.

Figure 6:
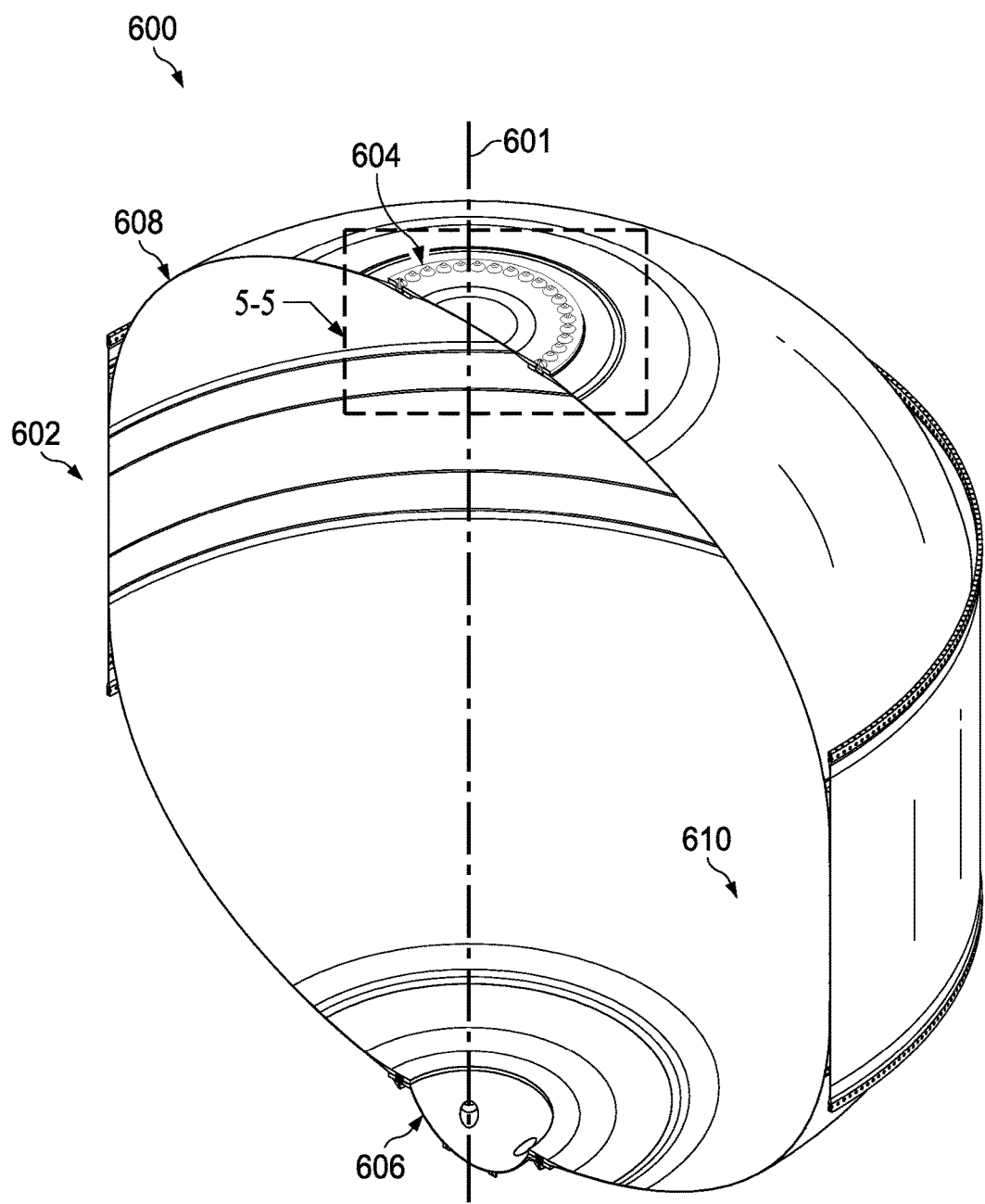
FIG. 6 is an illustration of a cross-sectional isometric view of a composite tank with a number of composite joints in accordance with an illustrative embodiment.

Turning now to FIG. 6, an illustration of a cross-sectional isometric view of a composite tank with a number of composite joints is depicted in accordance with an illustrative embodiment. Composite tank 600 may be a physical implementation of composite tank 102 of FIG. 1. Composite joint 200 of FIG. 2 may be used in composite tank 600. Composite joint 500 of FIG. 5 may be a portion of composite tank 600. For example, composite joint 500 may be a view within box 5-5 in FIG. 6.

Composite tank 600 has axis 601, composite body 602, polar cap 604, and polar cap 606. Polar cap 604 is connected to curved wall 608 of composite body 602 using a composite joint, such as composite joint 104 of FIG. 1. Polar cap 606 is connected to curved wall 610 of composite body 602 using a composite joint, such as composite joint 104 of FIG. 1. In some illustrative examples, the components of the composite joint for polar cap 604 and the composite joint for polar cap 606 are substantially the same.

Figure 7:
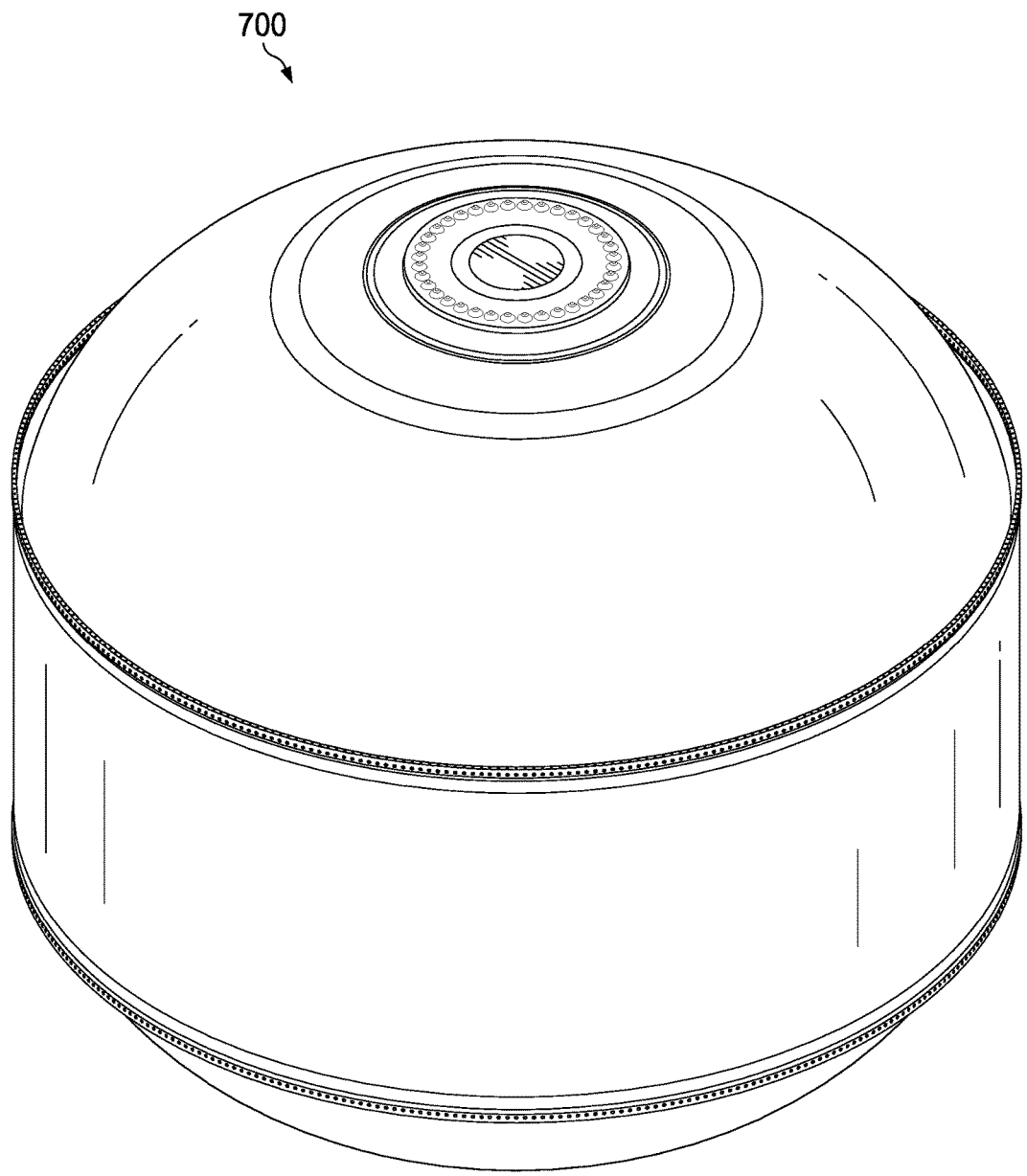
FIG. 7 is an illustration of an isometric view of a composite tank with a number of composite joints in accordance with an illustrative embodiment.

Turning now to FIG. 7, an illustration of an isometric view of a composite tank with a number of composite joints is depicted in accordance with an illustrative embodiment. View 700 may be an isometric view of composite tank 600 of FIG. 6. As depicted, polar cap 604 is substantially round.

The different components shown in FIGS. 2-7 may be combined with components in FIG. 1, used with components in FIG. 1, or a combination of the two. Additionally, some of the components in FIGS. 2-7 may be illustrative examples of how components shown in block form in FIG. 1 can be implemented as physical structures.

Figure 8:
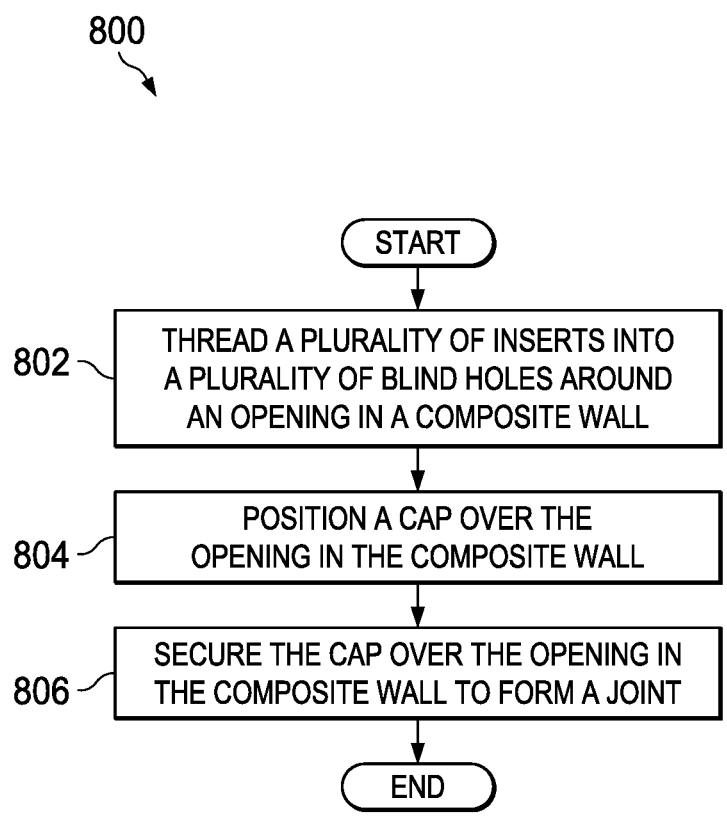
FIG. 8 is an illustration of a flowchart of a method for forming a composite joint in accordance with an illustrative embodiment.

Turning now to FIG. 8, an illustration of a flowchart of a method for forming a composite joint is depicted in accordance with an illustrative embodiment. A composite joint, such as composite joint 104 of FIG. 1, composite joint 200 of FIG. 2, or composite joint 500 of FIG. 5, may be created using process 800.

Process 800 threads a plurality of shear fittings into a plurality of blind holes around an opening in a composite wall (operation 802). Process 800 positions a cap over the opening in the composite wall (operation 804). Process 800 secures the cap over the opening in the composite wall to form a joint (operation 806). Afterwards, the process terminates. In some illustrative examples, securing the cap over the opening in the composite wall comprises inserting a plurality of bolts through the cap and threading the plurality of bolts into the plurality of shear fittings.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 800 may further comprise applying adhesive to at least one of the plurality of shear fittings or the plurality of blind holes prior to threading the plurality of shear fittings into the plurality of blind holes. In some examples, process 800 further comprises drilling the plurality of blind holes around the opening in the composite wall. In some examples, process 800 further comprises precision machining a plurality of holes through the cap such that walls of the plurality of holes engage the plurality of shear fittings when the cap is secured over the opening in the composite wall.

The illustrative embodiments provide a method and apparatus for joining a polar cap and a composite wall. A plurality of shear fittings is threaded into a plurality of blind holes. Blind installation avoids tank wall penetrations at polar joint fasteners. Installing the shear fitting engagement threads wet with epoxy may prevent shear fitting rotation in the flight vibration environment of a spacecraft or an aircraft.

A large diameter hollow shear fitting is lighter than the equivalent solid shear pin for meeting thread pullout strength and bearing strength requirements. A large engagement diameter also allows pullout and bearing strength requirements to be met with thinner, lighter, composite polar flange and cover than would be used to carry the same loads through a solid shear pin.

Wrenching features are provided on the cover side of the shear fitting to support threading the shear fitting into the composite tank wall. By combining shear fitting wrenching flats with the threads for engagement of the tension bolt in a projection of the fitting inside the sump or cover, the improved joint tension bolt can be made smaller in diameter and short, providing the necessary stiffness for clamping adjacent seals with less weight than would be needed for a design with a longer clamping load.

The joint design includes larger diameter holes in the sump or cover than traditional joint design. As a result, a thicker and larger diameter bridging washer is used under the tension bolt head to distribute clamping pressure over the seal glands. The weight impact of the larger washer can be reduced by taking advantage of the simple compressive load paths in the washer to use a low coefficient of thermal expansion (CTE), low density, monolithic ceramic, or ceramic matrix composite (CMC) material for the washers. Some examples of materials for bridging washer materials include, but are not limited to, alumina, carbon/silicon-carbide, or silicon-carbide/aluminum-oxide. The low bridging washer CTE reduces the amount of thermal contraction mismatch that must be taken up, allowing use of a smaller and lighter Belleville washer for preload retention than would otherwise be used.

The illustrative examples provide a composite joint with at least one of fewer leak paths, a larger polar opening, or lower joint weight than joints formed of other materials, such as metals. Further, the illustrative examples provide a composite joint with at least one of fewer leak paths, a larger polar opening, or lower joint weight than composite joints utilizing shear pins extending through holes in both components. Thus, payload could be increased on an aircraft or a spacecraft using composite joints provided in the illustrative examples.

Although threaded fittings in a blind threaded composite hole is conventionally believed to be unreliable, testing with conventional inserts for magnesium has provided evidence to the contrary. The insert of approximately 0.45" in diameter was threaded into a countersunk hole in a composite block of approximately 3.25 inches tall by 3.75 inches wide by 1.75 inches deep. The center axis of the insert was transverse to the fibers of the composite material. Three testing specimens were generated. During pullout testing, the testing specimens each remained functional past 5,000 pounds of force, with two of the specimens withstanding over 5,500 pounds of force.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite tank comprising:
    a curved wall having an opening;
    a plurality of shear fittings threaded into a plurality of blind holes in the curved wall around the opening;
    a cap positioned over the opening; and
    a plurality of bolts engaging the plurality of shear fittings and joining the cap to the curved wall to form a joint between the cap and the curved wall, wherein each of the plurality of shear fittings comprises a surface contacting an interior surface of a respective hole of the cap.

2. The composite tank of claim 1 further comprising:
    a plurality of washers, wherein the plurality of bolts extends through the plurality of washers, and wherein the interior surface of each of the plurality of holes in the cap engages a face of a respective washer of the plurality of washers.

3. The composite tank of claim 2, wherein each of the plurality of washers is a ceramic matrix composite material or a monolithic ceramic.

4. The composite tank of claim 1 further comprising:
    a second curved wall having a second opening;

a second plurality of shear fittings threaded into a second plurality of blind holes in the second curved wall around the second opening; and a second plurality of bolts engaging the second plurality of shear fittings and joining a second cap to the second curved wall to form a second joint between the second cap and the second curved wall.

5. The composite tank of claim 1, wherein the plurality of blind holes is threaded.

6. The composite tank of claim 1, wherein the plurality of shear fittings is a plurality of hollow shear fittings.

7. The composite tank of claim 1, wherein central axes of the plurality of blind holes are substantially parallel to each other and substantially perpendicular to an interface plane between the cap and the curved wall.

8. A composite joint comprising:
a composite wall having a polar opening;
a polar cap;
a plurality of shear fittings threaded into an edge of the polar opening, wherein each of the plurality of shear fittings comprises a surface contacting an interior surface of a respective hole of the polar cap; and
a plurality of bolts extending through the polar cap and engaging the plurality of shear fittings.

9. The composite joint of claim 8, wherein the plurality of shear fittings is threaded into a plurality of blind holes in the composite wall.

10. The composite joint of claim 8 further comprising:
an adhesive between threads of the plurality of shear fittings and the composite wall.

11. The composite joint of claim 8 further comprising:
a plurality of washers engaging the plurality of bolts and the polar cap.

12. The composite joint of claim 11, wherein each of the plurality of washers comprises a flange contacting the interior surface of each respective hole of the polar cap.

13. The composite joint of claim 12, wherein a diameter of the shear fitting surface contacting the interior surface of the hole and a diameter of the flange are substantially the same.

14. The composite joint of claim 11, wherein each of the plurality of washers is a ceramic matrix composite material or a monolithic ceramic.

15. The composite joint of claim 8, wherein the shear fittings are hollow shear fittings.

16. A method comprising:
threading a plurality of shear fittings into a plurality of blind holes around an opening in a composite wall;
positioning a cap over the opening in the composite wall; and
securing the cap over the opening in the composite wall to form a joint, wherein each of the plurality of shear fittings comprises a surface contacting an interior surface of a respective blind hole of the cap.

17. The method of claim 16, wherein securing the cap over the opening in the composite wall comprises:
inserting a plurality of bolts through the cap; and
threading the plurality of bolts into the plurality of shear fittings.

18. The method of claim 16 further comprising:
applying adhesive to at least one of the plurality of shear fittings or the plurality of blind holes prior to threading the plurality of shear fittings into the plurality of blind holes.

19. The method of claim 16 further comprising:
drilling the plurality of blind holes around the opening in the composite wall.

20. The method of claim 16 further comprising:
precision machining a plurality of holes through the cap such that walls of the plurality of holes engage the plurality of shear fittings when the cap is secured over the opening in the composite wall.

\* \* \* \* \*